United States Patent [19]

Wagner

[11] 4,282,618
[45] Aug. 11, 1981

[54] DIE FOR CUTTING SCREW-THREADS

[75] Inventor: Rudolf Wagner, Stuttgart, Fed. Rep. of Germany

[73] Assignee: Rems-Werk Christian Föll und Söhne GmbH & Co., Waiblingen, Fed. Rep. of Germany

[21] Appl. No.: 58,507

[22] Filed: Jul. 18, 1979

[51] Int. Cl.³ .............................................. B23G 5/08
[52] U.S. Cl. ................................. 10/111; 10/120.5 R
[58] Field of Search ............. 10/101 R, 111, 120.5 R; 408/221

[56] References Cited

U.S. PATENT DOCUMENTS

| | | | |
|---|---|---|---|
| 1,494,464 | 5/1924 | Cressey | 10/101 UX |
| 2,041,027 | 5/1936 | Sintz | 408/221 |
| 3,160,038 | 12/1964 | Wood | 10/101 X |
| 3,688,323 | 9/1972 | Bruck | 10/101 X |

FOREIGN PATENT DOCUMENTS

| | | | |
|---|---|---|---|
| 2435417 | 2/1976 | Fed. Rep. of Germany | 10/101 |
| 1144904 | 10/1957 | France | 10/111 |

*Primary Examiner*—Howard N. Goldberg
*Attorney, Agent, or Firm*—Becker & Becker, Inc.

[57] ABSTRACT

A die for cutting screw-threads, especially for cutting threads into steel for reinforcing concrete and the like with an external thread cutting machine to which the die is operatively connectible by means of a mounting portion having a support surface is disclosed. The die includes a cutting portion having a plurality of cutting teeth arranged in a cutting plane and a guide portion adjacent said cutting portion, which guide portion has a plurality of teeth arranged in a guide plane. The length of the guide portion corresponds to about 3 to 6 times the length of the cutting portion and is approximately 10 to 20 times the length of the cutting plane.

13 Claims, 8 Drawing Figures

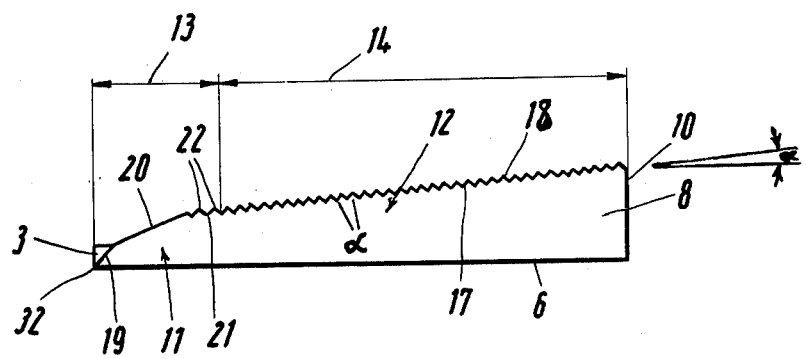
Fig. 2
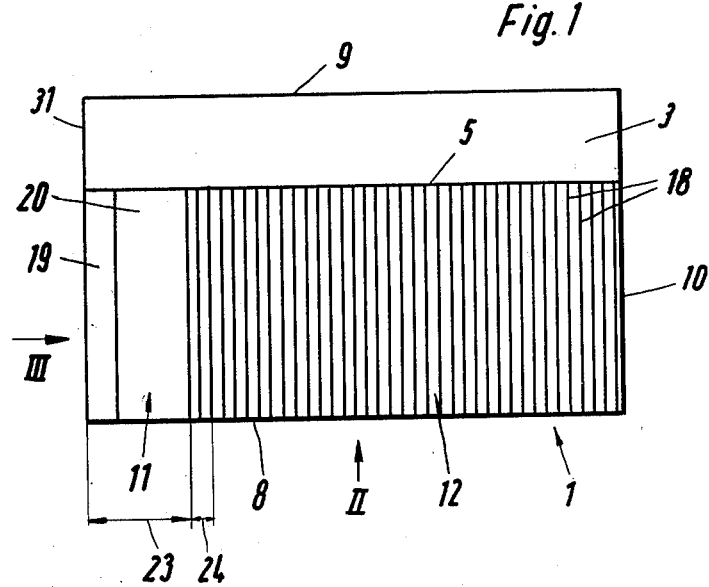
Fig. 1
Fig. 3

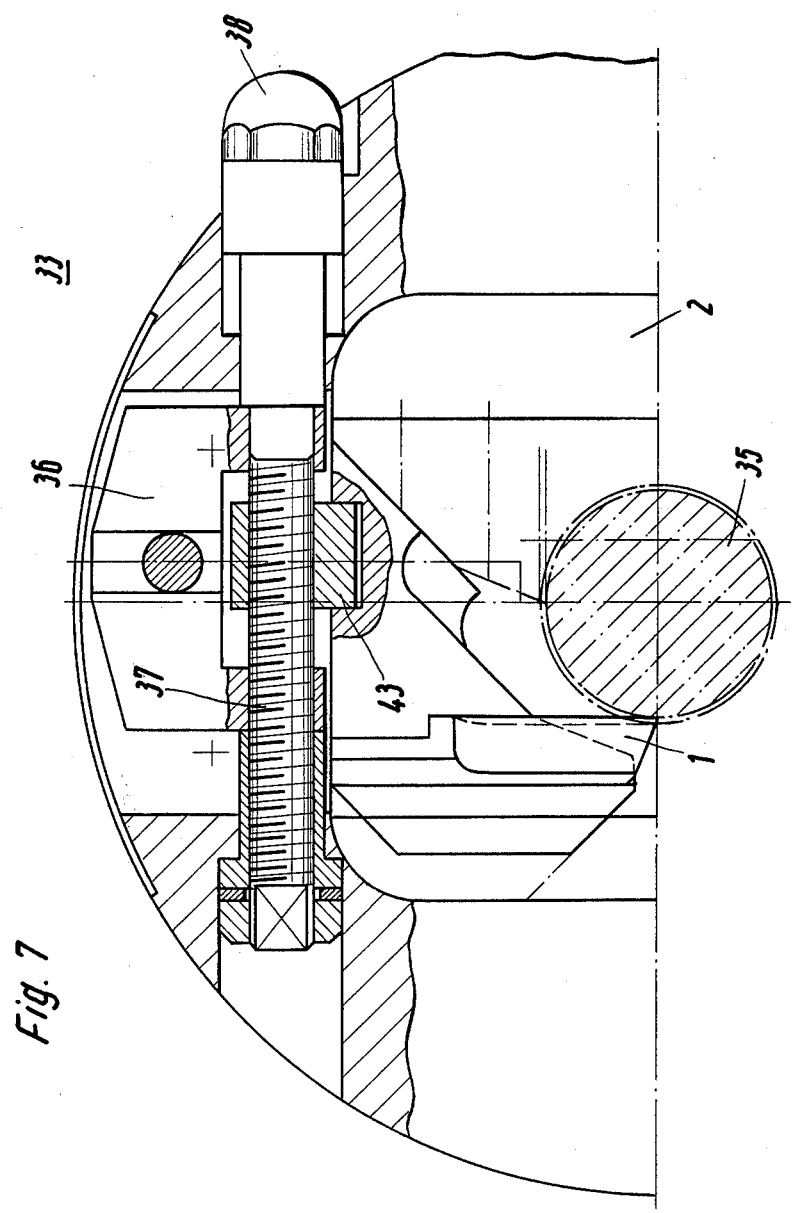

DIE FOR CUTTING SCREW-THREADS

The present invention relates to a die for cutting threads, especially for cutting threads into steel for reinforcing concrete or the like, with an external thread cutting machine to which the die is operatively connectible by means of a mounting portion having a support surface, which die also includes a cutting portion having a plurality of cutting teeth arranged in a cutting plane and a guide portion adjacent said cutting portion, which guide portion has a plurality of teeth arranged in a guide plane.

The known dies for cutting threads of this type produce an external threading on steel, i.e. rods having tapered ends, for reinforcing concrete. The threaded ends of such reinforcing steel rods serve to join these rods with connecting pieces which are anchored in a block of concrete for positive transmission of pretensioning forces. For strength- and tension-conditions of such reinforcing members, the conical outer threading is advantageous. Respectively two reinforcing members are connected by means of a sleeve or connecting piece having a corresponding interior conical threading. In order to attain an optimal strength- and tensioning behavior, the conical outer threading should extend to the ribs, or knobs, which are provided on the circumference of the pertaining reinforcing members.

Heretofore no threading could be produced with the known thread cutting dies in the region of the ribs of the reinforcing members. In the region away from the ribs, the die is guided by means of a guide portion, this being in contact with the threading which is being cut or produced, along the reinforcing member during the axial movement. As soon as the cutting portion of the die is close to the ribs, the guide portion, however, is disconnected or removed from the threads being cut, after a short axial movement at a point away from the ribs, so that the dies are not guided at this moment and screw-threads are not produced on the portion of the reinforcing member having ribs.

It is an object of the present invention to provide a die in such a way that screw threads can be cut or produced therewith in the region of the ribs of reinforcing members for concrete or the like.

This object and other objects and advantages of the invention will appear more clearly from the following specification in connection with the accompanying drawings, in which:

FIG. 1 is a top plan view of a die for cutting threads in accordance with one embodiment of the invention;

FIG. 2 is a side elevational view of the embodiment in FIG. 1 in the direction indicated by arrow II in FIG. 1;

FIG. 3 is an end view of the embodiment shown in FIG. 1 in the direction indicated by arrow III in FIG. 1;

FIG. 7 is a cross-sectional view through part of a spindlehead of a thread cutting machine indicating the location of the thread cutting dies.

Figure 4:
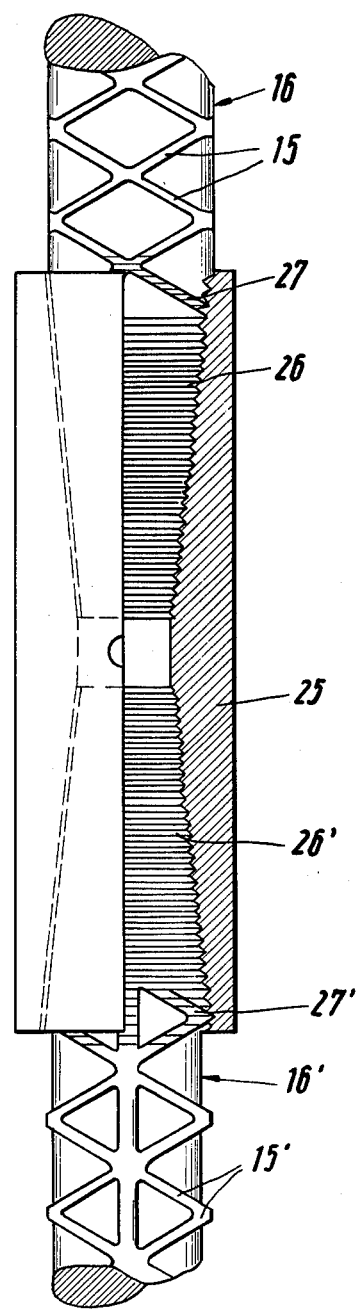
FIG. 4 is a side elevational view, partly in cross-section, of two reinforcing members for concrete which are connected by a sleeve, in which the ends of the reinforcing members are provided with screw threading produced by dies in accordance with the present invention.

The die for cutting threads according to the invention is characterized primarily therein that the length, measured in the longitudinal direction of the die, of the guide portion corresponds to about three to six times the length of the cutting portion and that the length of the guide portion is approximately 10 to 20 times the length of the cutting plane of the cutting portion.

Because of the inventive configuration, when screw-threads are cut, the teeth of the guide portion engage the reinforcing member in the region of the ribs in the threads already produced in the area or region away from the ribs of the reinforcing members, so that a die is positively guided and produces on the reinforcing members a positive threading. The threading on the reinforcing members can also be subjected to loads occurring when two reinforcing members are threadedly connected by means of a sleeve having a corresponding interior threading. Thus, particularly favorable strength-and tensioning conditions are attained.

In accordance with another embodiment of the invention, the guide portion has a length of from about 40 mm to about 110 mm, preferably a length of from about 50 mm to about 70 mm.

In accordance with another embodiment of the invention, the cutting plane of the cutting portion of the die, which cutting plane is arranged in a common plane with the guide plane of the guide member, is adjacent to a lateral surface or wall at an obtuse angle, particularly at an angle of about 170°, with the lateral surface embracing an angle with the support surface which is acute, preferably about 45°.

In accordance with yet another embodiment of the invention, the cutting plane of the die includes a lateral surface which is adjacent the mounting surface and an intermediate surface which is next to this at an obtuse angle, preferably at an angle of from about 140° to 170°.

In accordance with another embodiment of the invention, the length of the lateral surface, measured in the longitudinal direction of the die, is greater than the length of the cutting plane, preferably about 4 to 6 times thereof.

In accordance with still another embodiment of the invention, the guide plane is arranged at an angle α of from about 4° to 8° to the mounting surface, preferably at an angle of about 6°.

In accordance with yet another preferred embodiment of the invention, the mounting portion is of constant thickness over its length and merges with a step with the cutting portion and the guide portion.

In accordance with yet another embodiment of the invention, the pertaining longitudinal side or surface of the die forms the pertaining narrow side or surface of the guide portion.

Referring now particularly to the drawings, the die 1 for cutting threads according to FIGS. 1 to 3 comprises a generally monolithic steel member of generally rectangular outline in plan view (FIG. 1). For operatively mounting the die 1 in a thread cutting machine there is provided a mounting member 2 (FIGS. 5 and 6) which is adapted to engage with a mounting portion 3 of die 1. This mounting portion 3 is formed by an edge portion of the die which edge portion forms a longitudinal side thereof, and which mounting portion 3 is of a lesser height than the nominal height of the die 1. The planar upper surface 4 of the mounting portion 3 is at an obtuse angle, preferably at right angle to the end face 5 (FIG. 3) with the end face 5 being also at an obtuse angle, preferably at a right angle, with the upper side of the die 1 to form a step. The mounting portion 3 is of constant width and thickness over its effective length measured in the longitudinal direction of die 1. The width of the mounting portion is less than half the width of die 1; preferably the width is ¼ of the width of the die 1. Thus, the mounting portion 3 is of sufficient width for positively securing it, and thereby the die 1, in the mounting member 2. Moreover, the remaining portions of the die which serve for cutting of the screw-threads and for guiding are of appropriate width.

The die 1 has a planar mounting surface 6 (FIG. 2) which is formed by the underside of die 1 and with which the die is in contact on a countersurface 7 of the mounting member 2 in its installed position. Due to the substantial area or extent of the mounting surface 6, the die 1 is securely supported in the mounting member 2. The mounting surface 6 is at an obtuse angle to a forward end face 8 and at a right angle to a rearward end face 9. The forward end face 8 extends over the entire height of die 1 while the rearward end face 9 forms the forward surface of the mounting portion 3 and is of constant height.

The two end faces 8 and 9 of the die are joined by the lateral surface 10 which is at a right angle to the two end faces and forms a narrow side of the die 1.

The die has a cutting portion 11 and a guide portion 12 which, respectively, measured in the longitudinal direction of the die 1, have a length 13 and 14 (FIG. 2). The guide portion 12 and the cutting portion 11 have the same width. The length 14 of the guide portion 12 corresponds to about 3 to 6 times the length 13 of the cutting portion 11. The guide portion 12 is between about 40 mm and 110 mm in length; preferably the length is of from about 50 mm to about 70 mm. This will provide for a secure guiding of a die with small dimensions when it cuts screw threads with its cutting portion 11 into the ribs 15 of steel for reinforcing concrete, i.e., rods 16 (FIG. 4).

The cutting portion 11 and the guide portion 12 are of generally rectangular outline according to the plan view of FIG. 1, whereby the longitudinal side of the cutting portion 11 is parallel to the narrow side of the die and forms the narrow side of the guide portion 12, the longitudinal sides of which are parallel to the longitudinal sides of the die (FIG. 1). The cutting portion 11 and the guide portion 12 have common forward and rearward end faces which are provided by the end faces 5 and 8, respectively. The forward end face 8 extends over the common height of the die 1 while the rearward end face 5 extends from the upper side of the guide portion 12 and the cutting portion 11 to the planar upper side or surface 4 of the mounting portion 3.

The guide portion 12 has a guide plane or surface 17 in which are arranged parallel to one another first cutting teeth 18. The guide plane 17 extends at an angle α of about 4° to 8°, preferably 6°, to the mounting surface 6. In view of this position of the guide planes 17 it will be of particular advantage to cut conical screw threads, whereby the inclination of the guide plane 17 will determine the angle of conicity at which the screw threads to be cut are arranged.

The upper side of the cutting portion 11 has a lateral surface or plane 19 which extends at an acute angle of about 45° to the mounting surface 6. The lateral surface 19 extends over the entire width of the cutting portion 11 and has a constant width. The lateral surface 19 is connected, by means of an intermediate surface 20, which extends at an angle of from about 140° to about 170°, preferably about 150°, to the lateral surface 19, to a cutting surface 21. This cutting plane 21 follows the intermediate surface 20 at an angle of about 170°. This will facilitate the initial cutting of the screw-thread cutting. In the cutting plane 21 there extend parallel to one another and to the teeth 18 of the guide portion 12 second cutting piece 22 which extend over the full width of the cutting portion 11. In the plan view according to FIG. 1 the length 23 measured in the longitudinal direction of the die 1 of the lateral surface and the intermediate surface 20 amount to about 4 to 6 times the corresponding length 24 of the cutting plane 21, so that the cutting portion is of sufficient thickness in the region of its cutting teeth 22 in order to positively absorb the forces due to screw-thread cutting. The length 14 of the guide portion 12, furthermore, amounts to about 10 to 20 times the length 24 of the cutting plane 21. Thus, the guide portion 12 is of such a length that it affords a positive guide for the die 1 when cutting screw threads into the ribs 15 of a rod or the like for reinforcing concrete. Due to the angular arrangement of the lateral surface 19 and the intermediate surface 20 relative to the cutting plane 21, they will not interfere with cutting of the screw threading by means of the second cutting teeth 22.

The depth of the teeth of the cutting teeth 22 increases in the direction from the intermediate surface 20 towards the guide portion 12. Thus, the cutting tooth 22 which is immediately next to or following the intermediate surface 20 need not cut the screw threads into reinforcing steel such as 16 to the full depth. The final depth is cut at least with the next cutting piece 22, preferably with at least two following cutting teeth. This will reduce the wear of the cutting teeth and correspondingly increase the life thereof.

In accordance with the length 13 of the cutting portion 11 and the length 24 of the cutting plane 21, at least two cutting teeth 22 serve for screw thread cutting. As is indicated in FIG. 1, the cutting teeth 22 and the first cutting teeth 18 of the guide portion 12 are alike in length.

Referring now to FIG. 4 there are shown two pieces of steel for reinforcing concrete, i.e., rods 16 and 16' which are connected to one another by a sleeve 25. The rods have at their respective ends conical screw threads or threading 26 and 26', respectively, which has been cut using a die according to the embodiment shown in FIGS. 1 to 3. The cutting teeth 22 of the cutting portion 11 furnish the conical threading 26, 26' starting from the free end of the rods 16, 16'. Thereby, the die is moved along the reinforcing steel. The screw threading is gradually brought to the ultimate thread depth during axial movement of the die corresponding to the depth of the teeth 22 which increases in the direction towards the guide portion 12. On further axial movement of the die 1, the following teeth 18 of the guide portion 12 then engage in the threading just produced by the teeth 22, and, accordingly, guide the die during the screw-thread cutting operation. The conical threadings 26, 26' are in the region which is free of ribs, knobs, or similar projections 15, 15'. In order to attain, in consideration of high strength and tension conditions, an optimally load-bearing arrangement, the screw threads are extended to include the region of ribs 15, 15'. With the die in accordance with the present invention there can be positively provided screw threading on such ribs or projections. During axial movement of the die the cutting portion 11 with its cutting teeth 22 reaches the region of ribs 15, 15' and cuts into these thread portions designated by the numerals 27, 27' which form continuations of the conical threadings 26, 26'. During cutting of the thread portions 27, 27', the die, due to the substantial length 14 of the guide portion 12 in comparison to the cutting portion 11, or to the cutting plane 21, is guided in the conical threadings 26, 26' in the region which is free of ribs, whereby the teeth 18 of the guide portion 12 engage in the threadings 26, 26'. Due to the secure guiding, the thread portions 27, 27' can be positively produced on ribs 15, 15'. In the assembly, the rods 16, 16' can be inserted into sleeve 25 for such a length that also the portions 27, 27' contribute in the connection with the sleeve 25. The thread portions 27, 27', of course, are only on the ribs 15, 15' which project radially beyond the core of rods 16, 16'. The ribs are arranged in such a way that they are waferlike. It will be appreciated, however, that they can be in other arrangements on the rib-steel-comb and they can be of other cross sectional configuration.

Figure 5:
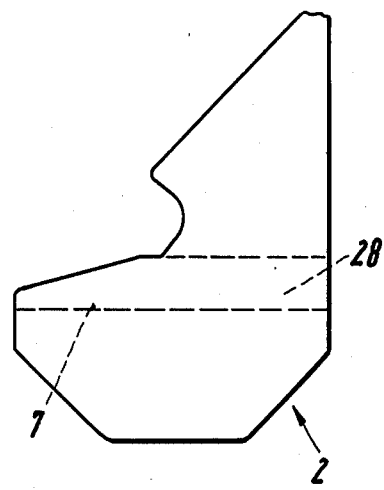
FIG. 5 is a side elevational view of a die mounting member for operatively connecting the die to a thread cutting machine.
Figure 6:
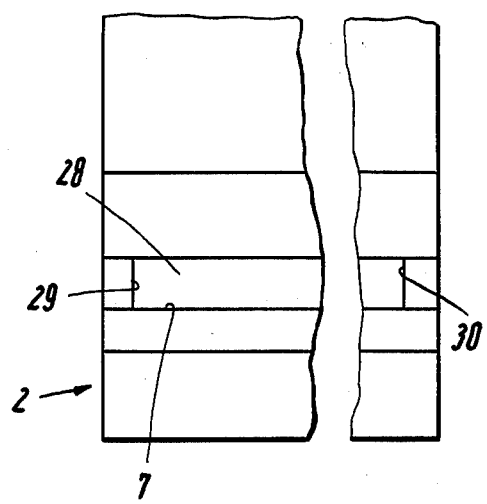
FIG. 6 is an end view of the mounting member in accordance with FIG. 5.

For screw thread cutting, the die in accordance with FIGS. 1 to 3 can be assembled in a mounting member 2 according to FIGS. 5 and 6. The mounting member 2 has a rectangular, in cross section, receiving aperture 28 the bottom of which is provided by the counter surface 7. The aperture 28 is limited by side surfaces 29, 30, against which the die is in contact with its pertaining lateral surfaces 10 and 31. In the lateral surface or plane 31 of the die are the pertaining lateral surfaces of the mounting portion 3 and the edge 32 which is formed by the lateral surface 19 and the mounting surface 6. The die is adjustably supported in the receiving aperture 28 so as to be adjustable in the mounting member 2 in the direction of the article to be machined therewith.

Figure 8:
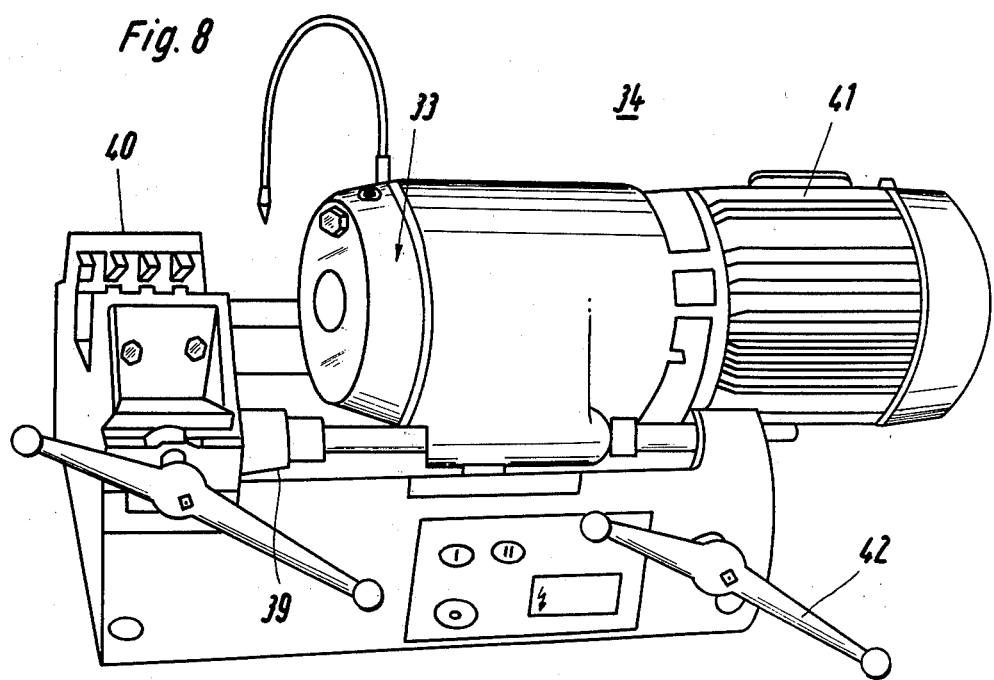
FIG. 8 is a perspective view of a thread cutting machine in which the thread cutting dies in accordance with the present invention can be used.

In the cutting heads 33 of an exemplary machine for cutting outer threading, generally designated by the numeral 34 (FIGS. 7 and 8), there are provided four mounting members 2 evenly arranged about the circumference of the article to be machined, generally designated by the numeral 35. For radial adjustment of the mounting member 2 there is provided a carrier 36 through which is passed a spindle 37 (FIG. 7). The end of spindle 37 which extends out of head 33 has an abutment piece 38 which cooperates during the cutting with a so-called "master" cone 39 which is arranged at the machine 34 to be in the path of the abutment piece 38. The conical shape of the cone 39 determines the pitch of the conical threading.

For cutting of the conical threading, the reinforcing steel is secured in a clamping device 40 arranged at the forward end of the machine 34 so that the rod extends with its free end into the cutting head 33 of machine 34. The cutting head 33 is rotatingly driven by a motor 41.

A control cam 43 is threadably arranged on the spindle 37. By means of control cam 43 one of the mounting members 2 can be adjusted along the spindle 37. The mounting members 2 are arranged in the cutting head 33 in such a way that by shifting of this one mounting member 2 also the other mounting members are correspondingly adjusted.

At the beginning of the screw thread cutting operation, the dies 1 are moved to the free end face of the rod secured in clamping device 40. For this the spindle 37 is rotated whereby the mounting members 2 with the dies 1 are radially adjusted relative to the rod 60. Upon actuation of motor 41, the cuting head 33 is rotated. At each rotation or revolution the abutment piece 38 of spindle 37 contacts the surface of cone 39. In accordance with the shape of the cone 39, the spindle 37 is moved in axial direction. Correspondingly the mounting members 2 with die 1 are adjusted. The cutting head 33 is moved in the direction toward the clamping device 40 by means of the control lever 42, whereby the mounting members 2 in conformity with the inclination of the surface of the cone 39 are adjusted in such a way that the desired threading is cut into the rod. At the end of the screw thread cutting operation the dies are automatically disengaged from the article 35.

The present invention is, of course, in no way restricted to the specific disclosure of the specification and drawings, but also encompasses any modifications within the scope of the appended claims.

What I claim is:

1. A die for cutting external taper screw threads into tapered ends of externally ribbed steel for reinforcing concrete with an external thread-cutting machine to which the die is operatively connectible, said die comprising:

a cutting portion of finite length and having a plurality of first cutting teeth arranged in a cutting plane, said cutting plane having a finite length measured in the longitudinal direction of said die, said first cutting teeth having a tooth depth increasing within said cutting plane rearwardly to final depth; and a guide portion adjacent said cutting portion, said guide portion having a predetermined length measured in the longitudinal direction of said die and having a plurality of second cutting teeth arranged in a guide plane, said predetermined length of said guide portion corresponding to about 3 to about 6 times the magnitude of said infinte length of said cutting portion, and said predetermined length of said guide portion being of from about ten to about twenty times the magnitude of said finite length of said cutting plane, said second cutting teeth in said guide portion having a constant tooth depth corresponding to the final tooth depth in said cutting portion.

2. A die according to claim 1, wherein said predetermined length of said guide portion is of from about 40 mm to about 110 mm.

3. A die according to claim 1, wherein said predetermined length of said guide portion is from about 50 mm to about 70 mm.

4. A die according to claim 1, wherein said die has a base surface and wherein said guide plane and said cutting plane are arranged on a common plane remote from said base surface, and comprising a lateral surface adjacent said cutting plane at an obtuse angle, and said lateral surface embracing an acute angle with said base surface.

5. A die according to claim 4, wherein said obtuse angle is an angle of about 170° and wherein said acute angle is an angle of about 45°.

6. A die according to claim 4, wherein said lateral surface has a length measured in the longitudinal direction of said die which is greater than the magnitude of said finite length of said cutting plane.

7. A die according to claim 6, wherein the length of said lateral surface is of from about 4 to 6 times the magnitude of said finite length of said cutting plane.

8. A die according to claim 4, wherein said guide plane is arranged at an angle of from about 4° to about 8° to said base surface.

9. A die according to claim 10, wherein said angle is about 6°.

10. A die according to claim 1, wherein said die has a base surface, and wherein said cutting plane includes a lateral surface adjacent said base surface and an intermediate surface adjacent said lateral surface at an obtuse angle.

11. A die according to claim 10, wherein said obtuse angle is an angle of from about 140° to about 170°.

12. A die according to claim 1, wherein said die further comprises a mounting portion, said mounting portion being of uniform thickness over its effective length measured in the longitudinal direction of said die and merging with a step with said cutting portion and said guide portion.

13. A die according to claim 1, wherein the pertaining longitudinal side of said cutting portion forms the pertaining narrow side of said guide portion.

* * * * *

UNITED STATES PATENT AND TRADEMARK OFFICE
CERTIFICATE OF CORRECTION

PATENT NO. : 4,282,618

DATED : August 11, 1981

INVENTOR(S) : Rudolf Wagner

It is certified that error appears in the above—identified patent and that said Letters Patent is hereby corrected as shown below:

On The Title Page Insert:

-- (30) Foreign Application Priority Data

July 19, 1978 (DE) Fed. Rep. of Germany....2831718 --.

Signed and Sealed this

Thirteenth Day of October 1981

[SEAL]

*Attest:*

GERALD J. MOSSINGHOFF

*Attesting Officer*  *Commissioner of Patents and Trademarks*